United States Patent
Olsson

[19]
[11] Patent Number: 5,913,178
[45] Date of Patent: Jun. 15, 1999

[54] MICROPHONE IN A SPEECH COMMUNICATOR

[75] Inventor: Anders Jörgen Olsson, Lund, Sweden

[73] Assignee: Telefonaktiebolaget LM Ericsson, Stockholm, Sweden

[21] Appl. No.: 08/848,189

[22] Filed: Apr. 29, 1997

[30] Foreign Application Priority Data

May 3, 1996 [SE] Sweden ................................. 9601702

[51] Int. Cl.$^6$ ..................................................... H04B 1/38
[52] U.S. Cl. ............................ 455/575; 455/90; 455/351; 379/433; 379/434; 381/338; 381/375; 381/382
[58] Field of Search .............................. 455/90, 66, 550, 455/575, 568, 569, 570, 128, 347, 350, 351; 379/428, 433, 434; 381/338, 375, 382, 370

[56] References Cited

U.S. PATENT DOCUMENTS

| 5,197,091 | 3/1993 | Takagi et al. . |
| 5,446,789 | 8/1995 | Loy et al. . |
| 5,555,449 | 9/1996 | Kim .......................................... 455/575 |
| 5,761,298 | 6/1998 | Davis et al. ............................. 381/370 |

FOREIGN PATENT DOCUMENTS

| 0275996 | 7/1988 | European Pat. Off. . |
| 0707403 | 4/1996 | European Pat. Off. . |
| 3725326 | 2/1989 | Germany . |

OTHER PUBLICATIONS

PCT International–type Search Report, Search Request No. 96/00512, dated Mar. 26, 1997.

*Primary Examiner*—Doris H. To
*Attorney, Agent, or Firm*—Burns, Doane, Swecker & Mathis, L.L.P.

[57] ABSTRACT

The present invention relates to a sound guide (5) in a speech communicator, for example a land mobile radio, a walkie talkie, a cordless telephone or a mobile telephone (1). To achieve good sound quality in such a telephone, a cover (3) is often used which reflects the speech in towards the microphone (6) in the body (2) of the telephone. By arranging an air tunnel as a sound guide (5) on the flip-cover and letting it conduct to the body of the telephone and the microphone, the sound quality is improved substantially. In order to avoid uneven frequency response which inevitably occurs in such sound guides due to resonance formation, attenuation material of conventional type is used inside the sound guide together with acoustic extinction by utilizing pressure minimums as a localization point for the microphone.

15 Claims, 4 Drawing Sheets

MICROPHONE IN A SPEECH COMMUNICATOR

TECHNICAL FIELD

The invention relates to voice take-up in a telephone/speech communicator with a microphone, and to the microphone and its placement.

THE STATE OF THE ART

Mobile telephones and other hand-held speech communicators of today, such as walkie talkies, land mobile radios and cordless telephones, often have the microphone placed inside the body of the telephone and in that end closest to the mouth to obtain the best possible sound take-up. By placing the microphone close to the mouth, the ratio of direct sound from the speaker to the noise contributed by the surroundings is large, thus providing a high signal/noise ratio (SNR). Since we are progressing towards smaller and smaller mobile telephones, this means that the telephones are starting to become so small that they hardly "reach" the mouth if held in conversation position, i.e. with the telephone speaker pressed to the ear.

EP 0 275 996 shows a telephone with a flip-cover which is swung out from the body of the telephone for conversation. This flip-cover is used to conduct, via a sound inlet therein, sound from the mouth into the microphone located inside the body of the telephone. The sound inlet consists of a slot in the flip-cover and an air channel leading to the body of the telephone with its microphone, which is disposed in the "speaking end" of the telephone body, i.e. the end closest to the flip-cover. The problem with such air channels with one end closed and the other open is that resonant phenomena occur so that overtones are always formed. Since the air channel, according to the document, is delimited at one end by the microphone, there will arise a number of overtones/resonance frequencies which will give a very uneven frequency curve with a corresponding number of peaks. This fact of course has a negative effect on the sound quality. Placing attenuating material on the inside of the air channel is possible to attenuate the various overtones. In order to obtain good attenuation and to obtain an even frequency response, much attenuating material is required which often leads to lessened acoustic sensitivity. As an alternative it is also possible to place the microphone in the end of the flip-cover. In this case, it is relatively unprotected, and it is also difficult to make a reliable electrical contact between the flip-cover and the body of the telephone. It is also more diffi-cult to protect the microphone and the contact junction against radio frequency interference.

SUMMARY

The following description presupposes that the microphone is placed inside the body of the telephone.

Today, a mobile telephone can be made so small that the mouth will be so far away from the microphone that the desired speech quality cannot be achieved when the telephone is held in the conversation position. This results in a too small portion of the speech and a too great portion of the surrounding noise being taken up by the microphone. In part, this problem can be dealt with by a cover which can be flipped out from the body of the telephone. The flip-cover guides or reflects the speech in towards the microphone. Since this is often not sufficient in very small telephones, other methods must be used to catch the speech. This can be done by arranging some type of sound guide on the flip-cover, for example, an opening into a cavity which leads, inside the flip-cover, to the body of the telephone where the micro-phone can be placed. In this manner, the speech can be "collected". The additional advantage is also achieved that some of the surrounding noise is shut out.

When a sound guide as described above is arranged with an opening in the flip-cover and an air passage/sound guide to the microphone in the other end of the sound guide, there will arise, in accordance with the laws of physics, standing waves, which, in the frequency spectrum, can be viewed as a fundamental component and a number of overtones. These interfere with each other, and a number of sound maximums and sound minimums will arise. This creates an uneven frequency transmission which is revealed in frequency response measurements. Resonance peaks will appear in the speech spectrum. By attenuating the sound guide in various ways (at the sound pressure minimums the particle velocity of the air molecules is greatest), the frequency curve can be evened out. It can be sufficient to attenuate a small number of resonance peaks (2 or 3) to obtain an acceptable frequency response curve within the speech spectrum. Unfortunately, there is a trade off when attenuation occurs at several locations in the conductor, since the speech as a whole can be attenuated too much so that the sound taken up by the microphone will be too weak to achieve sufficient acoustic sensitivity. The problem can thus be described in short as how to obtain, with the aid of a sound channel contributing to a high SNR by its opening being placed close to the speaker's mouth, an even frequency curve without sacrificing the acoustic sensitivity by applying too much attenuating material inside the sound channel.

The invention solves this trade off problem by not placing the microphone at the innermost end of the sound guide but instead placing it at a distance which is ⅔ of the total length of the conductor as measured from the opening. Calculations show that this is suitable since interference cancels at this point the second overtone, which thus cannot create a resonance peak. The first overtone is attenuated out in the usual manner by some chosen method. In this manner, a straight frequency response is achieved at the same time as it is possible to retain high acoustic sensitivity together with a high SNR, since one does not need to attenuate away the second overtone in the conventional manner. Furthermore, these calculations show that an additional advantageous effect can be achieved if the length of the sound guide is ca.6 centimeters. In this case the second overtone will appear at about or slightly over 4 kHz. This is very desirable since digital telephone systems have a sampling frequency of 8 kHz and a voice spectrum which, according to the Nyqvist theory, thus cannot contain frequencies above half the sampling frequency, i.e. 4 kHz, if so-called aliasing distorsion is to be avoided.

The distance between a microphone, which is mounted inside the mobile telephone, and the speaker's mouth is today ca. 4 centimeters. By making the length of the conductor 6 centimeters and allowing it to protrude ca. 4 centimeters from the body of the telephone, the microphone can still be placed inside the body of the telephone itself. The remaining 2 centimeters of the conductor are thus inside the body of the telephone, or the sound guide is made to turn back out into the flip-cover.

BRIEF DESCRIPTION OF THE FIGURES

One embodying example of the invention will be described below with reference to the accompanying drawings, of which.

PREFERRED EMBODIMENT

Figure 1:
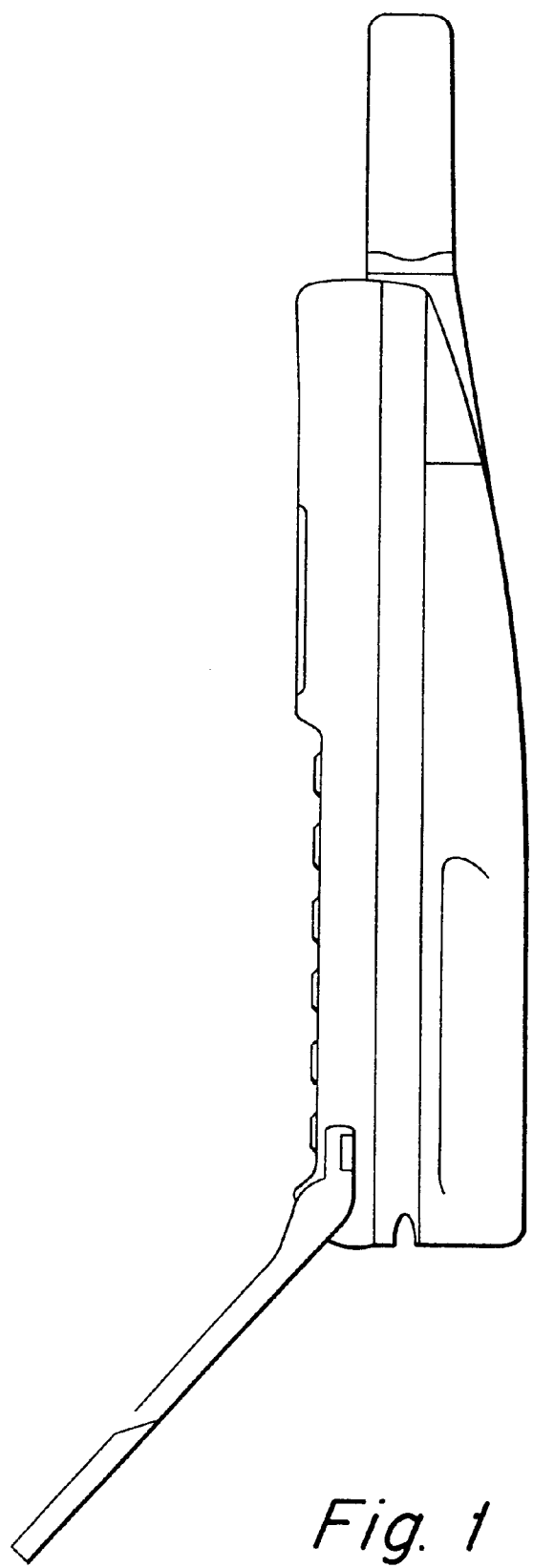
FIG. 1 shows in a side view a prior art portable telephone.
Figure 2A:
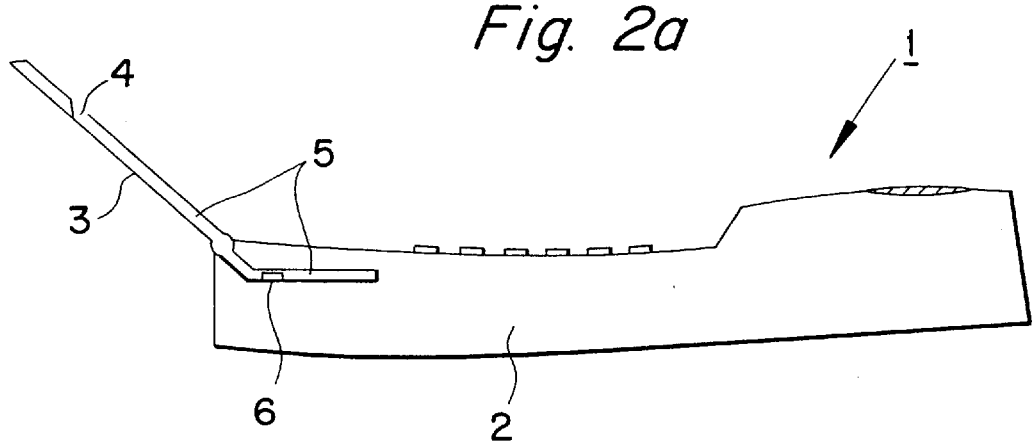
FIG. 2a shows a side view of a portable telephone according to the invention, in an embodiment with the microphone in the sound guide.
Figure 3A:
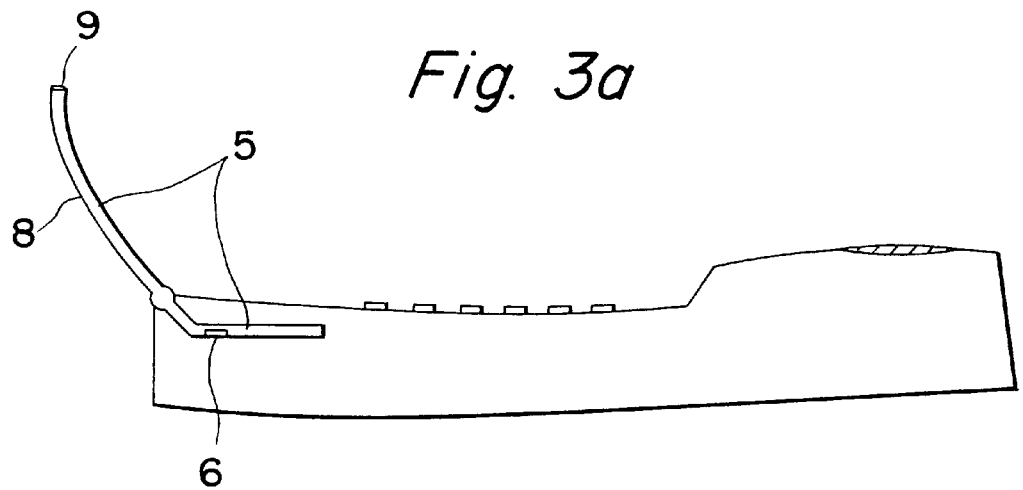
FIG. 3a shows a side view of a portable telephone according to the invention, in an additional embodiment with a tube instead of a flip-cover.

According to a preferred embodiment, FIG. 2a shows a telephone 1 with a cover 3 which can be flipped out from the telephone body 2. On the flip-cover there is a slotting 4, and from there a sound guide 5, i.e. a hollow passage, leads to the tele-phone body 2. The sound guide then continues into the telephone body and functions as a conductor of the speech into the microphone 6. It should be noted that the sound guide does not need to have the appearance given in the figure. Rather, it can, for example, be molded as a raised portion in the plastic on top of the flip-cover as an air tunnel, or be made as a slot along one edge of the flip-cover. The invention is thus not limited by the shape, placement or path of the sound guide. It can also take the form as in FIGS. 3a and 3b of a simple tube 8, which protrudes from the telephone body with an opening 9 at its distal end closest to the speaker's mouth.

A flip-cover would then be superfluous. Common to the various embodiments is, however, that the sound guide 5 leads into the telephone body 2 and that the micro-phone 6 is placed within the telephone body.

Figure 2B:
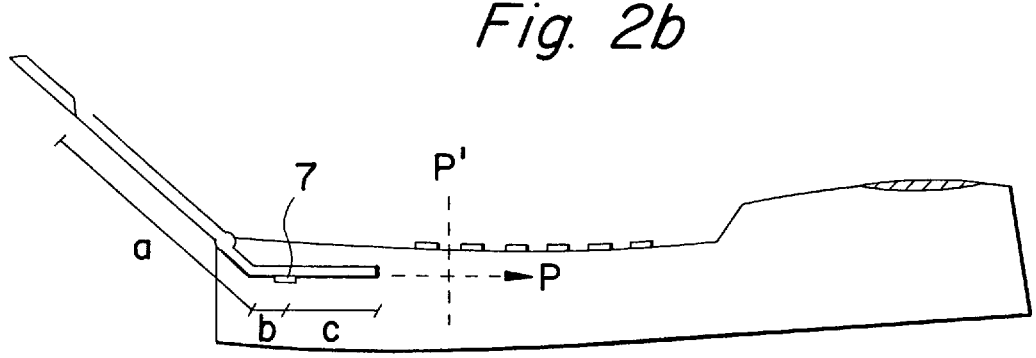
FIG. 2b shows a side view of a portable telephone according to the invention, in an embodiment with the microphone in a cavity in the sound guide wall.
Figure 3B:
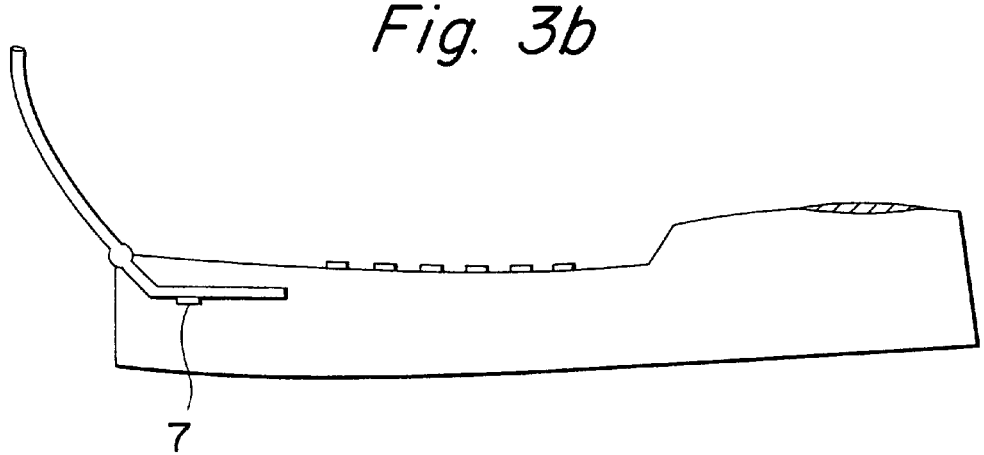
FIG. 3b shows a side view of a portable telephone according to the invention, with the same design as in FIG. 3a but with an alternative microphone placement.

It is also conceivable to place the microphone sunk into a cavity 7 in the sound guide, as in FIGS. 2b and 3b, or simply in a suitable hole in the sound guide wall.

Figure 4:
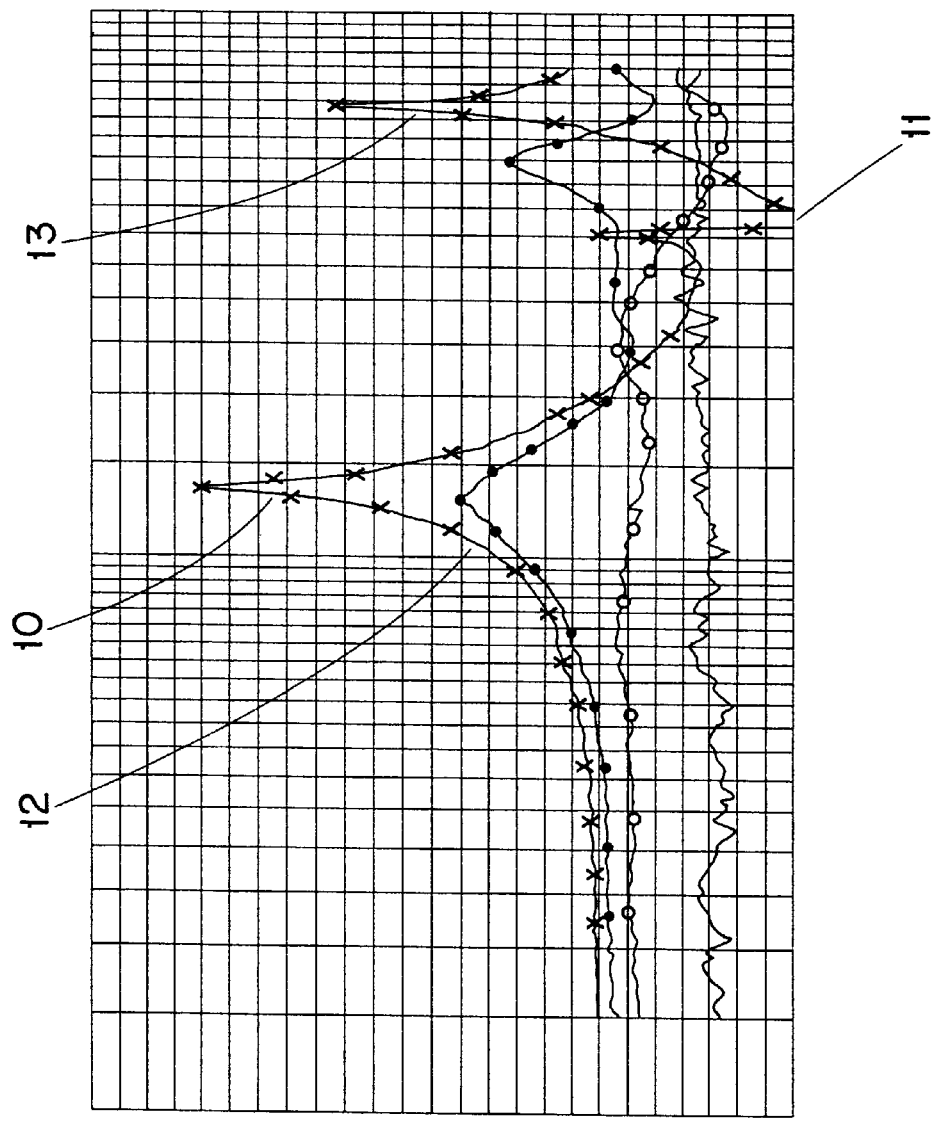
FIG. 4 shows a frequency response curve from sound recording in an experimental configuration.

With the sound guide according to the invention, resonance frequencies will arise, in accordance with the laws of physics, at different locations on a frequency response curve, depending on how long the tube is. By selecting the length of the sound guide to be ca. 40–60 millimeters, the first resonance frequency 10 will arise at 1430–2150 Hz and the second at 4300–6450 Hz, as is shown in FIG. 4, which describes the frequency response curves in a test configuration where a 60 millimeter sound guide was used and was placed with its opening 30 millimeters from an artificial mouth. In the uppermost x-marked curve 12, where no attenuating material was used inside the sound guide, it can be seen that the curve is quite uneven. This unevenness is then attenuated out in the test configuration in two steps with different amounts of attenuating material, as can be seen in the two middle curves. Hence, the second uppermost curve shows the sound guide with attenuating material used inside, and the second downmost curve shows the sound guide with even more attenuating material used. The fourth and downmost curve shows the frequency response with the microphone at the same distance from the mouth, but without any sound guide. By computing where the pressure minima will arise in a tube of a certain length, it is thus possible to place attenuating material precisely at those locations and thus get rid of the resonance peaks. The disadvantage is that one must attenuate quite a bit and at several locations within the conductor, to provide an even frequency curve. This affects the acoustic sensitivity as is clearly shown in the diagram. The more attenuating material one uses, the poorer the sensitivity will be, i.e. the curves will lie lower on the y-axis.

Since the desired speech spectra in GSM must not contain frequencies higher than 4 kHz, it is necessary, in accordance with the Nyqvist theory, to sample at at least double that frequency, and this is done in digital telephone systems, where the sampling frequency Fs is 8 kHz. It is then desirable that the frequency response contain as little energy as possible above 4 kHz, otherwise aliasing distorsion effects will arise in the speech spectrum, which will lessen the sound quality. If one selects a length of the sound guide which is 40–60 millimeters, the second resonance frequency will, as mentioned above, be 4300–6450 kHz. This can, according to the invention, be acoustically extinguished by placing the microphone at a distance of ⅔ of the total length of the sound guide as measured from its opening 4, inside the sound guide. FIG. 4 reveals that the resonance is completely extinguished and dips down below the graph at 11 to then rise again to a third resonance peak 13. Actually it is desirable to attenuate away frequencies from 4000 Hz and not from 4300 Hz. For those dimensions of the conductor given above, the attenuation will arise at ca. 4000 Hz and not at the theoretically calculated 4300 Hz, since the sound guide will, "from an acoustic point of view", be longer, i.e. it will take longer for the sound to propagate in the sound guide if it is lined with attenuating material. Thus, all the resonance frequencies are reduced somewhat and will end up as desired. At a certain point, in accordance with the calculations below, various overtones will cancel each other and no resonance peak will be caused by the second overtone at that location.

The following calculations show theoretically where the microphone should be placed to achieve the desired effect.

Assumptions: The sound guide has one end open and the other closed. All sound regardless of frequency can be received by a microphone mounted in the closed end of the sound guide. At certain frequencies, so-called resonance frequencies, the sound guide substantially amplifies the sound. These resonance frequencies occur when there is room for an odd number of quarter-wave lengths ($\lambda/4$) in the conduc-tor, i.e. the length of the tube is equal to an odd number of quarter-wave lengths. A sound guide with this property is also called a quarter-wave pipe.

In such a pipe, resonances occur at the wave lengths $\lambda$:

1) $\lambda = 4L/(2n+1)$ where L=the length of the pipe in meters and where n=0,1,2, . . . .

which produces the resonance frequencies (f):

2) $f = v/\lambda = ((2n+1)v)/4L$ where v=propagation velocity of sound in air (ca. 344 m/s).

In the quarter-wave pipe, a standing wave arises and in this standing wave, the sound pressure maximum and the velocity maximum in the air molecules are dis-placed 180 degrees relative to each other. This means that at the closed end, where the speed of motion due to the solid wall is equal to zero, the sound pressure is greatest. Where in the pipe the first velocity of motion maximum (minimum sound pressure) occurs as measured from the open end, is determined by the equation:

3) $x = L - (\lambda/4)$ where x=the distance from the open end and $\lambda$ is derived from 1).

Thus, for the fundamental (n=0) the sound pressure minimum will occur at x=0, i.e. at the opening of the pipe, and for the second resonance (n=1) the sound pressure minimum will occur at $$x=L-4L/12=2L/3.$$

If L=6 cm, then $$x=2\times 6/3=4 \text{ cm}$$

If the microphone is placed at x=4, no sound pressure will thus be registered for the second resonance, i.e. 4300 Hz.

FIG. 2b shows the principle for placing the microphone: By defining in this embodiment the distance from the opening down to the bend in the sound guide as a and the distance therefrom to the middle of the microphone as b and the distance from there to the wall defining the end of the sound guide as c, the equation a+b=2c should be fulfilled to obtain the correct placement of the microphone.

What then remains is to attenuate out the first resonance frequency with the aid of some attenuating material, where the velocity of motion has a maximum. The attenuation can preferably be achieved with some form of porous material or a resistive acoustic grille which absorbs acoustic kinetic energy in the sound guide. It can be a sintered grille which is a fine-meshed grille of cross-laid thin steel wires. Alternatively, it is possible to make a constriction in the sound guide in the area in question. Another alternative is to make the sound guide very narrow in order to achieve in this way an attenuation of the resonance peaks. All of these alternatives are to be realized in the context of the microphone placement specified above.

FIGS. 2a, 2b, 3a, and 3b thus show various examples with sound guides which lead into the body of the telephone, where the microphone 6 is placed. At the point where the flip-cover or the tube is articulated to be folded in towards the body of the telephone, it is necessary to have some form of seal to not alter the acoustic proper-ties of the sound guide. It is also important that no interfering sounds should enter at this point.

The microphone may be placed in a cavity inside the sound guide or mounted in the wall of the sound guide with a microphone opening perpendicular to an axis of symmetry of the sound guide. For instance, as shown in FIG. 2b, the microphone opening may be directed along axis p', whereas the axis of symmetry of the sound guide is along axis p.

What is claimed is:

1. A device for sound take-up in a speech communicator, comprising:
    a housing body:
    a part which extends from the body of the communicator, having an opening which defines one end of a sound guide which leads into the body of the communicator; and
    a microphone placed in the body of the communicator in such a location relative to the sound guide that acoustic extinction of a resonance is obtained at said location.

2. The device for sound take-up in a speech communicator according to claim 1, wherein the microphone is placed in the body of the communicator at a distance of ⅔ of the total length of the sound guide, measured from its opening.

3. The device for sound take-up in a speech communicator according to claim 1, wherein the microphone is placed in a cavity inside the sound guide with a microphone opening perpendicular to an axis of symmetry of the sound guide.

4. The device for sound take-up in a speech communicator according to claim 1, wherein a first overtone in the sound guide is attenuated by a constriction in the sound guide at a location for a sound pressure minimum of the first overtone.

5. The device for sound take-up in a speech communicator according to claim 1, wherein a first overtone in the sound guide is attenuated by an acoustic attenuating filter placed at a location of a first sound pressure minimum of the first overtone.

6. The device for sound take-up in a speech communicator according to claim 1, wherein the speech communicator comprises one of: a land mobile radio, a walkie-talkie, a mobile telephone and a cordless telephone.

7. The device for sound take-up in a speech communicator according to claim 1, wherein the part which extends from the body comprises a fold-out cover.

8. The device for sound take-up in a speech communicator according to claim 1, wherein the part which extends from the body comprises a tube which extends from the body.

9. The device for sound take-up in a speech communicator according to claim 1, wherein the microphone is placed outside a wall of the sound guide with a microphone opening perpendicular to an axis of symmetry of the sound guide.

10. A method of sound take-up in a speech communicator, wherein the communicator comprises a housing body, a part which extends from the body of the communicator having an opening which defines one end of a sound guide which leads into the body of the communicator, and a microphone located in the body, the method comprising the step of placing the microphone in the body of the communicator relative to the sound guide at such a location that an acoustic extinction is obtained of a resonance at said location.

11. The method of sound take-up in a speech communicator according to claim 6, wherein the step of placing the microphone comprises the step of placing the microphone at a distance of ⅔ of the total length of the sound guide, as measured from its opening.

12. A device for sound take-up in a speech communicator, comprising:
    a housing body;
    a part which extends from the body of the communicator such that a portion of the part is located inside of the housing body and a portion of the part is located outside the housing body;
    a sound guide formed through the part, said sound guide having an opening at a distal end of the part located outside of the housing body
    a microphone placed in the body of the communicator in such a location relative to the sound guide that acoustic extinction of a resonance is obtained at said location.

13. The device for sound take-up in a speech communicator according to claim 12, wherein the microphone is located inside of the sound guide.

14. The device for sound take-tip in a speech communicator according to claim 12, wherein the microphone is located outside of the sound guide.

15. The device for sound take-Lip in a speech communicator according to claim 12, wherein the microphone is placed at a location which is ⅔ along the length of the sound guide, as measured from the opening of the sound guide.

* * * * *